3,728,171
STABILIZED PROPELLANT COMPOSITIONS AND METHODS FOR THEIR PREPARATION
Larry P. Bundy, Brigham City, Utah, assignor to Thiokol Chemical Corporation, Bristol, Pa.
No Drawing. Filed July 12, 1965, Ser. No. 471,795
Int. Cl. C06d 5/06
U.S. Cl. 149—19
31 Claims

ABSTRACT OF THE DISCLOSURE

Certain compositions, added to a high energy oxidizer, hydrazinium perchlorate, and a hydrocarbon polymeric fuel binder in a solid propellant formulation whereby said propellant is rendered curable to an elastomeric composition having good flexibility and hardness, where previously said propellant overcured to a hard and brittle material. The compositions are "stabilizers," having diverse structural forms representatively set forth below:

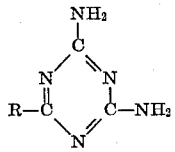

wherein R is hydrogen, phenyl, halogenated phenyl and/or $CX_4(CX_2)_n$, X being a halogen atom and $n$ is an integer ranging between 0 and 8.

---

This invention relates to a process for improving the curability of certain solid propellant compositions containing hydrazinium diperchlorate oxidizer and hydrocarbon binders, as well as the propellant compositions resulting from this process.

More particularly, this invention concerns certain stabilizing compositions which, when added to hydrazinium perchlorate based propellant compositions prior to curing, prevents premature curing and overcuring of the propellant mixture. The propellant compositions of this can be cured to a propellant having superior physical and aging properties.

Hydrazinium diperchlorate ($HP_2$) is an exceedingly energetic oxidizer. In addition to its exceptional potency, it has certain other advantages which would make it a desirable oxidizer component in solid propellant compositions. These advantages include high density, a high burning rate and relatively low sensitivity toward detonation from shock. In addition, the $HP_2$ is available in large quantities in a high state of purity at relatively moderate cost. The high density of the $HP_2$ permits high loading levels compared to many less energetic oxidizers. This in turn increases the available energy of the propellant composition on a unit weight basis and increases the potential range of the rocket hardware. The relatively low shock sensitivity of $HP_2$ facilitates formulating, handling and storage while availability and purity permit long term planning. All of these attributes of $HP_2$ are important considerations in military and aerospace operations.

Unfortunately, $HP_2$ has several defects which have prevented its widespread use in conjunction with many high energy binders such as the energetic hydrocarbon binders. Among these defects are poor compatibilty, a short processing life and, most important, poor curing properties when compounded with most of the desirable hydrocarbon fuel binders of the art.

Compatibility is an especially acute problem when $HP_2$ is formulated with polyalkadiene fuel binders containing reaction sites other than the unsaturated carbon to carbon bonds. These reaction sites are incorporated into the binder to facilitate curing of the binders. These sites include, among many others, carboxyl, carbonyl, epoxy, amino and the like. For reasons presently unknown, polyalkadienes containing these groups rapidly react with $HP_2$ to form an overcured (excessively crosslinked) hard and brittle material unsuitable for propellant use. The unusual thing is that this "pseudo" curing takes place even in the complete absence of curing agents. Until the present time, all previous attempts to obviate or to reduce the premature curing of $HP_2$-polyalkadiene propellant compositions have been unsuccessful.

That premature curing is a problem in $HP_2$-hydrocarbon compositions at all is most surprising in that the less energetic but presumably chemically equivalent perchlorate, ammonium perchlorate, acts as an inert filler insofar as curing is concerned. That is, ammonium perchlorate and the other perchlorates commonly used as oxidizers in the solid propellant art do not cause curing in the propellant mix in the absence of curing agent. For example, when ammonium perchlorate is formulated with a carboxyl terminated polybutadiene with the usual propellant adjuvants, the admixed propellant remains fluid and uncured until a curing agent is added to the mix and the temperature is raised to the curing temperature. Furthermore, when a prior art curing agent such as a trifunctional imine is blended into the propellant composition and the temperature is raised to a curing temperature, a flexible solid propellant having good aging and physical properties is produced.

In contrast, when $HP_2$ is substituted on a weight by weight basis for ammonium perchlorate in the above composition, the composition cures within a few hours to an undesirably hard and brittle state even in the absence of the imine curing agent.

Because of their poor physical and aging characteristics, the use of $HP_2$-hydrocarbon propellants has been disparaged in the art. As a result of the inability to utilize the economical and commercially available hydrocarbon resins with $HP_2$ oxidizer, a good deal of effort has gone into programs to develop satisfactory $HP_2$ propellant compositions using a variety of binders. In spite of the development of many costly exotic binders and a great deal of time, no truly satisfactory $HP_2$ based solid propellant compositions have been developed. That is, the resultant propellants give only fair cures and hence have relatively poor mechanical properties. In addition, such exotic binders are difficult to cure and are expensive to prepare.

Thus, the development of inexpensive $HP_2$-hydrocarbon propellant not subject to premature curing and overcuring would be a notable advance in the art. Particularly desirable would be a stable inexpensive $HP_2$-hydrocarbon binder propellant composition combining good curing and aging properties.

It is therefore an object of this invention, among others, to develop a method of improving the curability and compatibility of $HP_2$-hydrocarbon propellant compositions.

It is a related object of this invention to prepare highly energetic propellant compositions not subject to premature overcuring to a brittle state.

An additional object of this invention is to prepare highly energetic propellant compositions making use of the above method.

Another more specific object of this invention is to stabilize $HP_2$-polybutadiene propellant compositions, said polyalkadiene resins can contain reactive sites such as epoxy, hydroxy, carboxy, amino groups in addition to their carbon to carbon unsaturation.

Yet another object of this invention is to prepare novel and highly energetic $HP_2$ based propellant compositions containing hydrocarbon binder having good aging and physical properties both in the cured and uncured state.

Further objects are to prepare novel solid propellants having superior physical properties and "pot life."

The above objects, among others, are achieved by incorporating a relatively small amount of a novel stabilizer into the propellant mixture prior to curing, preferably during the blending operation. The amount of stabilizer required to prepare a properly cured propellant having good physical and aging characteristics is hereinafter referred to as a "stabilizing amount." This quantity cannot be stated precisely since it depends upon several variables including the quantity of $HP_2$ in the propellant, the particular hydrocarbon binder used and the choice of stabilizer. In most instances, a stabilizing amount has been found to range between about 0.10 and 6.0 parts by weight or stabilizer for each 100 parts by weight of uncured compounded propellant. However, in some cases, greater and lesser amounts of stabilizer have been used successfully.

The formulated, stabilized solid propellant composition consists essentially of the following components in the indicated range of proportions.

(1) From about 0.10 to 6.0 parts by weight of the inventive stabilizer(s).

(2) From about 45 to 85 parts by weight of $HP_2$ (hydrazinium diperchlorate) including supplementary oxidizer(s).

(3) From about 10 to 40 parts by weight of a hydrocarbon binder including 0.5–10 parts by weight of curing agent, curing catalysts and the like, and (4) Up to about 25 parts by weight of optional propellant adjuvants, ordinarily from 0 to 16 parts by weight of these optional components.

The above components of the propellant composition are blended, mixed or otherwise combined to yield a homogenous propellant mixture, then the mixture is cast into a rocket engine and cured at elevated temperature until the desired state of cure is obtained.

In practice, a stabilizing amount of stabilizer is blended with a hydrocarbon binder having reactive sites such as epoxy, carboxy, hydroxy, amino and the like, curing agents, with any optional propellant adjuvants, such as surfactants, anticaking agents, coolants, burning rate catalysts, powdered high energy metals and the like, until a homogenous mixture is produced. At this time, the $HP_2$ oxidizer is added with continuous blending. The blending (i.e., mixing) is continued until a homogenous and uniform uncured solid propellant is produced. The total blending time is dependent upon the batch size, the binder and stabilizer used, the viscosity of the formulation as well as other experimental variables, and thus cannot be stated with precision. However, in general, the mixing or blending time ranges between 30 minutes to 2 hours or more; although even somewhat longer mixing times are not harmful. After the propellant mixture has been blended, it is ordinarily cast into an engine casing and cured at temperatures ranging between about 100° F. and 200° F. until the required state of cure is obtained. The precise curing temperature and cure times are dependent upon variables such as the molecular weight of the binder, the nature and quantity of its reactive sites, whether these sites are terminal or secondary, the ratio of the components and the degree of hardness sought.

Because of these diverse considerations, the curing temperatures and times cannot be stated with precision. However, in propellant formulations containing 60–70 parts by weight of $HP_2$, 15–20 parts by weight of carboxyl containing polybutadiene binder, 1–3 parts by weight of trifunctional imine curing agent and 15–20 parts by weight of propellant adjuvants, the following curing times and temperatures are representative:

| Time in days | Curing temperature, ° F. |
| --- | --- |
| 20 | 100 |
| 10 | 120 |
| 5 | 135 |
| 3 | 150 |
| 2 | 170 |

A general range of curing times versus curing temperatures is set forth below:

| Type of binder | Curing temperature, ° F. | Curing time in hours |
| --- | --- | --- |
| Carboxyl terminated polybutadiene (mole wt. 500–5,000) | 100–200 | 480–48 |
| Carboxyl containing (secondary sites) (mole wt. 500–5,000) | 100–175 | 370–72 |
| Carboxyl containing (secondary sites) | 100–150 | 500–96 |

The following list of trifunctional imines are among the preferred curing agents for the propellant compositions of this invention:

tri(1-aziridinyl) phosphine oxide
tri(2-methyl-1-aziridinyl) phosphine oxide
tri(2,3-dimethyl-1-aziridinyl) phosphine oxide
tri(2-isopropyl-1-aziridinyl) phosphine oxide
tri(2-methyl-3-ethyl-1-aziridinyl) phosphine oxide
tri(2-isopropyl-1-aziridinyl) phosphine oxide
tri(2-methyl-3-n-butyl-1-aziridinyl) phosphine oxide
tri(2-hexyl-1-aziridinyl) phosphine oxide
tri(2,3-diheptyl-1-aziridinyl) phosphine oxide
tri(2-methyl-3-octyl-1-aziridinyl) phosphine oxide
tri(2-ethyl-3-decyl-1-aziridinyl) phosphine oxide
tri(2-dodecyl-1-aziridinyl) phosphine oxide
tri(2-methyl-3-tridecyl-1-aziridinyl) phosphine oxide
tri(2-ethyl-3-octadecyl-1-aziridinyl) phosphine oxide
tri(2-eicosyl-1-aziridinyl) phosphine oxide
tri(2-methyl-3-cyclopentyl-1-aziridinyl) phosphine oxide
tri(2-ethyl-3-cyclohexyl-1-aziridinyl) phosphine oxide
tri(2-n-butyl-3-(4-methylcyclohexyl)1-aziridinyl) phosphine oxide
tri(2-phenyl-1-aziridinyl) phosphine oxide
tri(2-phenyl-3-tetradecyl-1-aziridinyl) phosphine oxide
tri(2,3-diphenyl-1-aziridinyl) phosphine oxide
tri(2-tert-butyl-3-phenyl-1-aziridinyl) phosphine oxide
tri(2-ethyl-3-(1-naphthyl)1-aziridinyl) phosphine oxide
tri(2-n-propyl-3-(2-naphthyl)1-aziridinyl) phosphine oxide
tri(2-methyl-3-benzyl-1-aziridinyl) phosphine oxide
tri(2-monyl-3-benzyl-1-aziridinyl) phosphine oxide
tri(2-n-propyl-3-(2-phenylethyl)1-aziridinyl) phosphine oxide
tri(2-methyl-3-(4-methylphenyl)1-aziridinyl) phosphine oxide
tri(2-ethyl-3-(3-n-propylphenyl)1-aziridinyl) phosphine oxide
tri(2-hexyl-3-(3-n-propylphenyl)1-aziridinyl) phosphine oxide
tri(2-heptyl-3-(2,4-dimethylphenyl)1-aziridinyl) phosphine oxide
tri(1-aziridinyl) phosphine sulfide
tri(2-methyl-1-aziridinyl) phosphine sulfide
tri(2,3-dimethyl-1-aziridinyl) phosphine sulfide
tri(2,3-diethyl-1-aziridinyl) phosphine sulfide
tri(2-methyl-3-isopropyl-1-aziridinyl) phosphine sulfide
tri(2-tert-butyl-1-aziridinyl) phosphine sulfide
tri(2,3-didecyl-1-aziridinyl) phosphine sulfide
tri(2-ethyl-3-pentadecyl-1-aziridinyl) phosphine sulfide
tri(2-eicosyl-1-aziridinyl) phosphine sulfide
tri(2-methyl-3-cyclohexyl-1-aziridinyl) phosphine sulfide
tri(2-phenyl-1-aziridinyl) phosphine sulfide
tri(2-phenyl-3-benzyl-1-aziridinyl) phosphine sulfide
tri(2,3-diphenyl-1-aziridinyl) phosphine sulfide
tri(2-ethyl-3-phenyl-1-aziridinyl) phosphine sulfide
tri(2-amyl-3-benzyl-1-aziridinyl) phosphine sulfide Another group of useful compounds are the substituted melamines such as tripropylene and tributylene melamine imines of the structures:

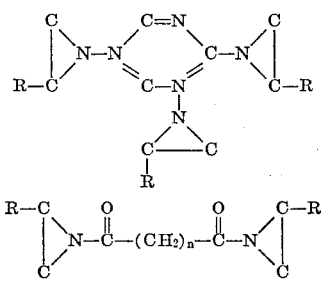

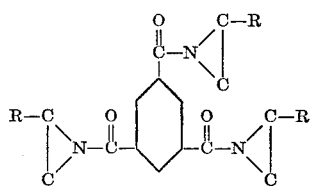

wherein R is a lower alkyl radical having from 1 to 4 carbon atoms and $n$ varies from 1 to 8. Particularly useful are those compositions where R=methyl or ethyl and $n=8$.

An additional useful group of curing agents are the alkylene derivatives of trimesic acid. These compounds are included within the formula:

wherein R is alkyl, preferably ethyl or methyl, or propyl or butyl.

When the preferred imines are used as curing agents, no curing catalysts or accelerators are needed. However, with epoxy curing agents, particularly trifunctional epoxy compositions, curing catalysts are desirable. The favored accelerators are the metallic salts of organic acids such as the iron salts of monobasic and dibasic aliphatic acids. These include, among others, iron salts of acids such as butyric, valeric, caproic, linoleic, caprylic, succinic and the like. These salts, while not contributing to the mechanical strength or stability of the cured propellant, accelerate the epoxy/carboxyl portion of the cure, particularly at lower (less than 70° C.) temperatures.

As indicated by the specifications listed above, where epoxy compositions are used as curing agents, the epoxy resin can be of diverse structure either aliphatic, aromatic, or heterocyclic. Apparently, the nonepoxide portion of the resin does not play an important part in the curing mechanism. For example, satisfactory results have been obtained when alkyl, alkene, alkyne or various aromatic epoxides have been utilized. The main requirement being that at least two, preferably more than two, reactive epoxide groups are available in the molecule.

Resins falling within this specification are manufactured by many prominent manufacturers and illustrative resins are described in their sales literature. Illustrative examples are ERLA-0510 [1], EO-1000 [2], and EPON-801-X [3].

Additional epoxide resins which can be used normally include any commercial epoxide resin falling within this general specification range:

Epoxy equivalence/100 grams _____ 0.85 to 1.50
Functionality _____ 2.0 to 4.0
Molecular weight _____ 100 to 800

Stabilizer

The stabilizers of this invention are of diverse structure and are difficult to catagorize. Many, but not all of these structures have been found to contain sulfur and nitrogen usually bound in a heterocyclic ring and have weakly basic characteristics. Further, many of these have aliphatic or heterocyclic substituents. However, some compositions which do not contain heterocyclically bound nitrogen or sulfur have been found to be good stabilizers. For this reason, no attempt is made to generically describe the stabilizers of this invention. The generic structures are shown below. Table I, which follows, lists the structural formula of a few of the preferred stabilizers. It is known that other similar compounds would function as stabilizers and it is suspected that many others not listed herein would also function as stabilizers.

(I)

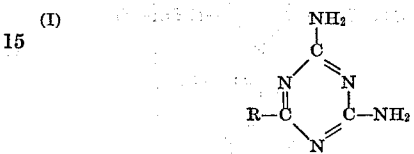

wherein R is selected from the group consisting of hydrogen, phenyl, halogenated phenyl, and $CX_3(CX_2)_n-$, X being a halogen atom, preferably chlorine, and $n$ is an integer ranging between 0 and 8.

(II)

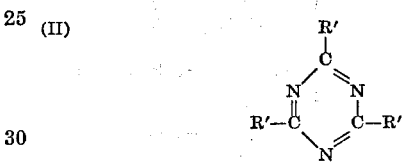

wherein R' is selected from the group consisting of hydrogen and alkyl radicals having from 1 to 8 carbon atoms.

(III)

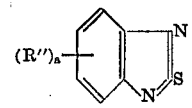

wherein R" is selected from the group consisting of hydrogen, alkyl and $CX_3(CX_2)_n-$ wherein the alkyl groups have from 1 to 8 carbon atoms, and varies between 0 and 3, and $n$ varies between 0 and 8.

(IV)

$$CX_3(CX_2)_n\overset{\overset{H}{N}}{\underset{\|}{C}}-NH_2$$

wherein X is halogen, preferably fluorine, and $n$ varies between 0 and 8.

TABLE I.—STRUCTURAL FORMULAS FOR COMPOUNDS LISTED AS STABILIZERS

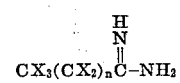

---

[1] ERLA-0512 has an epoxy equivalence/100 grams of 0.80 to 1.20.
[2] EO-1000 has an epoxy equivalence/100 grams of 0.70 to 1.10.
[3] EPON-801-X has an epoxy equivalence/100 grams of 0.75 to 1.15.

TABLE I—Continued
Chemical structure

4.

$$\text{p-Tosyl-C} \underset{N}{\overset{NH_2}{\underset{\parallel}{C}}} \underset{N}{\overset{}{C-NH_2}}$$

5.

$$CF_3-(CF_2)_2-C \underset{N}{\overset{(CF_2)_2-CF_3}{\underset{\parallel}{C}}} C-(CF_2)_2-CF_3$$

6.

$$CF_2-CF_2-C \underset{N}{\overset{CF_2-CF_3}{\underset{\parallel}{C}}} C-CF_2-CF_3$$

7.

$$CF_3-(CF_2)_3-C \underset{N}{\overset{(CF_2)_3-CF_3}{\underset{\parallel}{C}}} C-(CF_2)_3-CF_3$$

8.

$$CF_3-(CF_2)_4-C \underset{N}{\overset{(CF_2)_4-CF_3}{\underset{\parallel}{C}}} C-(CF_2)_4-CF_3$$

9.  $CF_3CF_2C\overset{NH}{\underset{\parallel}{-}}NH_2$

10. $CF_3(CF_2)_2C\overset{NH}{\underset{\parallel}{-}}NH_2$

11. $CF_3(CF_2)_3C\overset{NH}{\underset{\parallel}{-}}NH_2$ 12. (benzothiazole)

13. (CH₃)₂-substituted benzothiazole

14. CH₃-substituted benzothiazole 15. (CH₃)₃-substituted benzothiazole 16. bis-thiazole ring system with HC−N and CH−N

Oxidizer

The oxidizer of this invention is HP₂. The HP₂ can be augmented or supplemented with other oxidizers to modify the ballistic parameter of the propellant. The favored supplementary oxidizers are the perchlorates such as potassium, lithium or ammonium, hydrazinium nitroform, nitronium and nitryl perchlorates as well as other high energy oxidizers.

Binders

The binders of this invention are saturated and unsaturated hydrocarbon polymers. A favored group are the polyalkadienes containing reactive sites such as hydroxy, carboxy, carbonyl, epoxy, amino, imino and the like. Most of these polymers are commercially available products or can be made using known polymerization procedures. For example, polyalkadiene containing carboxyl groups can be prepared by polymerizing or reacting many materials including conjugated dienes containing from 4 to 8 carbon atoms such as 1,3-butadiene, isoprene, piperylene, methylpentadiene, 2-ethyl-1,3-butadiene, phenylbutadiene, 3,4 - dimethyl - 1,3 - hexadiene, 4,5 - diethyl - 1,3 - octadiene. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. In addition to the conjugated dienes, other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least one vinyl or alphamethylvinyl group, such as 2-vinylpyridine, 3-vinylpyridine, 4-vinylpyridine, 3-ethyl-5-vinylpyridine, 2 - methyl - 5 - vinylpyridine, 3,5 - diethyl - 4 - vinylpyridine, etc. In addition, mono- and disubstituted alkenyl pyridines and the like quinolines; acrylic acid esters, such as methyl acrylate, ethyl acrylate; alkacrylic acid esters, such as methyl methacrylate, ethyl methacrylate, propyl methacrylate, butyl methacrylate, pentyl methacrylate, vinyl ether, vinyl chloride, vinylidene chloride, vinylfuran, vinylcarbazole, vinylacetylene, etc. can be used as polymer substrates.

The above compounds, in addition to being polymerizable alone, are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3 - divinylpyridine, 3,5 - divinylpyridine, 3,5 - divinylpyridine, 2,4 - divinyl - 6 - methylpyridine, 2,3-divinyl-5-ethylpyridine, and the like.

Another group of superior binders are the saturated binders containing free carboxyl sites. These binders, which are the condensates of saturated glycols and saturated acids, are advantageous in certain respects compared to the corresponding polyalkadiene binders. For example, they are more energetic on a weight by weight basis and they are more compatible with HP₂. However, in the absence of the inventive stabilizers, the curability of these saturated hydrocarbon binders in the presence of HP₂ is no more satisfactory than that of the unsaturated binders. A specific saturated binder which is favored is the condensate of neopentyl glycol and Emery 3389 (a dimer acid condensation polymer sold by Emery Industries). Favored are the halogenated saturated binders such as the carboxyl containing fluoroalkanes.

The polymeric fuel binders of this invention can range in molecular weight from 250–12,000 or more, although the most satisfactory results have been obtained using carboxyl terminated hydrocarbon polymers ranging in molecular weight between 500–6,000. As indicated, especially favored are the carboxyl terminated polybutadienes and the neopentyl glycol condensate of that molecular weight range.

Propellant adjuvants

In addition to the curing agents, solvents, accelerators, polymerization and vulcanization catalysts and the like which are included within the fuel binder content of the inventive propellant compositions, certain additives, ignition catalysts, conditioning or modifying agents, surfactants, high energy metals, their hydrides and the like can often be advantageously added to the propellant compositions to alter or improve their physical and combustion characteristics. For convenience sake, these substances are herein generically referred to as propellant adjuvants and they can be present in the finished propellant composition in amounts up to about 30 parts by weight down to 0 part by weight of the final propellant composition.

More commonly, however, the adjuvants comprise from about 20 parts by weight or even less down to about 5 parts by weight of the propellant compositions. Among the many propellant adjuvants which can be used are included the following typical materials: plasticizers such as the alkylpthalates and the like, and darkening agents such as carbon black or lamp black, ballistic agents such as potassium sulfate, hygroscopicity inhibitors such as dinitro-toluene and various coolants, combustion and burning rate catalysts. The combustion catalysts are of diverse structure but generally are compounds containing oxygen. These catalysts can be inorganic or organic compounds. They include, among many others, such as ferrous, ferric, magnesium, titanium, calcium, molybdenum, and vanadium oxides and the like. Especially effective as combustion catalysts are the chromates and dichromates, generally with ammonium dichromate being a preferred catalyst. Organics such as nitrocellulose can also be effectively used.

A favored group of adjuvants are the finely divided lightweight and high energy metals and nonmetals such as aluminum, beryllium, boron, silicon and the like. These materials can be used by themselves, as their carbides and hydrides, or they can be employed in the form of their polymer coated particles.

Compounding the propellant mixtures

In preparing the stabilized solid propellant composition of this invention, the following preferred procedure, among many others, can be used.

The dried, finely divided $HP_2$ oxidizer including other oxidizers and the combustible fuel binder are placed in a blending vessel equipped with an efficient spark proof mixer and blended to a homogenous mixture. To this mixture is added any optional propellant adjuvants such as the finely divided high energy metals or metalloids. During these additions, efficient mixing is maintained until a homogenous mixture results. The total mixing time necessary for a uniform mixture varies according to the batch size, but ordinarily, at least 30 minutes of mixing is required with 90 minutes or more representing the extreme time. Finally, the curing agent(s) or catalysts are added and the mixing continued for an additional ½ to 1 hour. Finally, the uniformly blended uncured viscous propellant composition is cast into a mold of the desired configuration and the propellant mix is cured at the required temperature until the desired hardness is obtained. The temperature during the blending operation is usually around 66–86° F. although higher temperatures can be used if desired. The curing temperatures, as indicated previously, are dependent upon the particular resin used as a binder and the batch size, among other things, and thus cannot be stated with precision. However, the ranges of time and temperature given supra are typical for $HP_2$ based propellant compositions containing the inventive stabilizers.

Preferred propellant compositions

As indicated supra, for various reasons including better stability, physical and propulsion characteristics, cost and availability, certain of the novel propellants prepared by the novel process of this invention are preferred to others. In this instance, the preferred propellant compositions of this invention are made up of:

(1) From about 0.5–4.0 parts by weight of a stabilizer selected from the group consisting of:

1. 2,4-diamino-6-phenyl-s-triazine
2. 2,4,6-tris(heptafluoropropyl)-s-triazine
3. 2,4,6-tris(pentadecafluoroheptyl)-s-triazine
4. pentadecafluorooctylamidine
5. 1,3,5-triaza-1,3,5-trinitrocyclohexane
6. 1,3,5,7-tetraza-1,3,5,7-tetranitrocyclooctane
7. 2,4,6-tris(propyl)-s-triazine
8. 2,4,6-tris(methyl)-s-triazine
9. 2',5'-dimethyl-1,2,4,5-benzobisthiazole
10. benzimidazole
11. 2,1,3-benzothiadiazole
12. polybenzothiazole (2) From about 60–80 parts by weight of oxidizer including 0–20 parts by weight of ammonium perchlorate oxidizer and 60–80 parts by weight of $HP_2$.

(3) From about 15–25 parts by weight of a binder selected from the group consisting of saturated alkane, carboxyl containing binders having a molecular weight range of from about 500 to 6000 and carboxyl containing polybutadiene having a molecular weight range between about 500–6000.

(4) From about 10–20 parts by weight of a propellant adjuvant selected from the group consisting of particulated beryllium and aluminum powders.

To clarify some of the modifications and variations which can be made in the inventive concept, the following embodiments are submitted:

In one embodiment of this invention, the following propellant components are blended in an appropriately sized mixing vessel equipped with an efficient means of blending, cooling and heating in the manner described.

To a stirred 17% by weight portion of commercially available carboxy terminated polybutadiene having a molecular weight range between 500 and 6000 and an 0.53 eq. COOH per 100 g. This material, which is sold as Thiokol HC polymer, is added to 4 parts by weight of 1,1'-ethylenebis(2-ethyl)-aziridine curing agent, 1 part by weight of 2,4-diamino-6-phenyl-s-triazine stabilizer and 14 parts by weight degreased aluminum powder (having a particle size between 3 and 30 microns). After the mixture appears to be uniform, a 68 parts by weight portion of anhydrous propellant grade hydrazinium diperchlorate is blended in. The blending and mixing operation is continued for an additional 30–90 minutes and is cast into a mock-up rocket engine casing. The propellant is cured at 135° F. for 96 hours. The cured propellant had good flexibility, upon aging, good Shore A hardness and a satisfactory color.

In another embodiment of this invention, the experiment above is essentially repeated except that 17 parts by weight portion of beryllium powder (degreased) is substituted for the same portion of aluminum powder used above. The curing conditions and resultant physical properties are substantially the same.

In another embodiment using the same procedure described earlier, the following propellants are compounded and cured:

| Component: | Parts by weight |
|---|---|
| HC polymer | 13.83 |
| HX 868 (butylene imine of trimesic acid) | 3.17 |
| 2,4-diamino-6-phenyl-s-triazine | 1.00 |
| Aluminum | 14.00 |
| $HP_2$ | 68.00 |

The homogenous propellant is cured 96 hours at 135° F. to produce a propellant having good flexibility and Shore A hardness.

In another embodiment, the following components are mixed and cured as before:

| Component: | Parts by weight |
|---|---|
| HC polymer | 13.83 |
| HX 868 | 3.17 |
| 2,4,6-tris(heptafluoropropyl)-5-triazine | 1.00 |
| Aluminum | 14.00 |
| $HP_2$ | 68.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| HC polymer | 13.83 |
| HX 868 | 3.17 |
| 2,4-diamino-6-phenyl-s-triazine | 0.50 |
| Aluminum | 14.00 |
| HP$_2$ | 68.50 |

The homogenous propellant is cured 96 hours at 135° F. to produce a propellant having good flexibility and Shore A hardness.

In another embodiment, the following components are mixed and cured as before:

| Component: | Parts by weight |
|---|---|
| HC polymer | 14.12 |
| HX 868 | 2.88 |
| 2,4-diamino-6-phenyl-s-triazine | 1.00 |
| Aluminum | 14.00 |
| HP$_2$ | 68.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| HC polymer | 13.41 |
| HX 868 | 3.59 |
| 2,4,6-tris(pentadecafluoroheptyl)-s-triazine | 1.00 |
| Aluminum | 12.00 |
| HP$_2$ | 70.00 |

The homogenous propellant is cured 96 hours at 135° F. to produce a propellant having good flexibility and Shore A hardness.

In another embodiment, the following components are mixed and cured as before:

| Component: | Parts by weight |
|---|---|
| HC polymer | 13.00 |
| HX 868 | 4.00 |
| 1,3,5-triaza-1,3,5-trinitrocyclohexane | 1.00 |
| Aluminum | 14.00 |
| HP$_2$ | 68.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| HC polymer | 13.83 |
| HX 868 | 3.17 |
| 1,3,5,7-tetraza-1,3,5,7-tetranitrocyclooctane | 1.00 |
| Aluminum | 12.00 |
| HP$_2$ | 70.00 |

The homogenous propellant is cured 60 hours at 150° F. to produce a propellant having good flexibility and Shore A hardness.

In another embodiment, the following components are mixed and cured as before:

| Component: | Parts by weight |
|---|---|
| HC polymer ERL-0510 } 1.2:1.0 epoxy/CO$_2$H | 15.93 |
| DOA plasticizer | 3.00 |
| Iron linoleate | 0.05 |
| MAPO | 0.02 |
| 2,4-diamino-6-phenyl-s-triazine | 1.00 |
| Aluminum | 16.00 |
| HP$_2$ | 64.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| RB-1 (fluorinated diol) | 30.52 |
| PAPI (phenyl isocyanate) | 4.80 |
| Tricalcium phosphate | 1.00 |
| 3,4-diamino-6-phenyl-s-triazine | 1.00 |
| Aluminum | 3.00 |
| HP$_2$ | 60.00 |

The homogenous propellant is cured 48 hours at 135° F. to produce a propellant having good flexibility and Shore A hardness.

In another embodiment, the following components are mixed and cured as before:

| Component: | Parts by weight |
|---|---|
| HC polymer | 15.66 |
| HX 868 | 3.84 |
| 2,4-diamino-6-phenyl-s-triazine | 0.50 |
| Aluminum | 15.00 |
| HP$_2$ | 65.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| HC polymer | 14.4 |
| HX 868 | 4.8 |
| 2,4-diamino-6-s-triazine | 0.8 |
| Aluminum | 4.0 |
| NH$_4$ClO$_4$ | 20.0 |
| HP$_2$ | 56.0 |

The homogenous propellant is cured 54 hours at 135° F. to produce a propellant having good flexibility and Shore A hardness.

In another embodiment, the following components are mixed and cured as before:

| Component: | Parts by weight |
|---|---|
| USIHA | 15.30 |
| HX 868 | 4.70 |
| 2,4-diamino-6-phenyl-s-triazine | 1.00 |
| Aluminum | 15.00 |
| HP$_2$ | 64.00 |

The propellant mix is cured for 96 hours at 150° F. to produce a cure having good Shore A hardness and flexibility.

In another embodiment using the same procedure described above, that is, combining all the components except the oxidizer first and then adding oxidizer, the following propellants are compounded and cured:

| Component: | Parts by weight |
|---|---|
| USIHB | 13.00 |
| HX 868 | 6.00 |
| 2,4-diamino-6-phenyl-s-triazine | 1.00 |
| Aluminum | 15.00 |
| Mineral oil | 1.00 |
| HP$_2$ | 64.00 |

The homogenous propellant is cured 96 hours at 135° F. to produce a propellant having good flexibility and Shore A hardness.

In another embodiment, the following components are mixed and cured as before:

| Component: | Parts by weight |
|---|---|
| Dow QX 3812 | 9.28 |
| Dow EP 201 | 7.72 |
| 2,4-diamino-6-phenyl-s-triazine | 1.00 |
| Aluminum | 14.00 |
| HP$_2$ | 68.00 |

The propellant mix is cured for 96 hours at 150° F. to produce a cure having good Shore A hardness and flexibility.

As indicated by the various embodiments presented supra, numerous changes and modifications can be made without departing from the inventive concept. The metes and bounds of this invention are best shown by the claims which follow.

I claim:
1. A method of improving the curability of propellant compositions containing hydrazinium diperchlorate oxidizer, hydrocarbon polymer fuel binder and optional propellant adjuvant components, comprising the step of admixing with said components from about 0.1 to 6.0 parts by weight of a stabilizer per hundred parts by weight of propellant selected from the group consisting of:

(I)
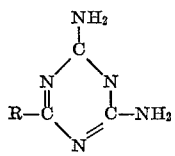

wherein R is selected from the group consisting of hydrogen, phenyl, halogenated phenyl, and $CX_3(CH_2)_n$—, X being a halogen atom, preferably chlorine, and $n$ is an integer ranging between 0 and 8.

(II)
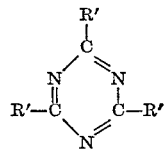

wherein R' is selected from the group consisting of hydrogen and alkyl radicals having from 1 to 8 carbon atoms.

(III)
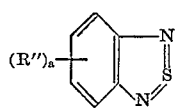

wherein R'' is selected from the group consisting of hydrogen, alkyl and $CX_3(CX_2)_n$— wherein the alkyl groups have from 1 to 8 carbon atoms, and varies between 0 and 3, and $n$ varies between 0 and 8.

(IV)
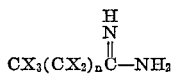

wherein X is halogen, preferably fluorine, and $n$ varies between 0 and 8.

2. The method of claim 1 wherein the stabilizer is admixed with said propellant components prior to curing and said components are present in the following proportions:
 (a) from about 45 to 85 parts by weight of oxidizer including hydrazinium diperchlorate oxidizer,
 (b) from about 10 to 30 parts by weight of hydrocarbon polymer fuel binder, and
 (c) 0 to 20 parts by weight optional propellant adjuvant.

3. The method of improving the curability of propellant compositions containing from about 45 to 85 parts by weight of hydrazinium disperchlorate oxidizer, from about 10 to 40 parts by weight of a polyalkadiene binder, and from about 0 to 25 parts by weight of optional propellant adjuvant components, comprising admixing with said propellant compositions prior to curing from about 0.1 to 6.0 parts by weight of a stabilizer selected from the group consisting of:
 (1) 2,4-diamino-6-phenyl-s-triazine
 (2) 2,4,6-tris(heptafluoropropyl)-s-triazine
 (3) 2,4,6-tris(pentadecafluoroheptyl)-s-triazine
 (4) pentadecafluorooctylamidine
 (5) 1,3,5-triaza-1,3,5-trinitrocyclohexane
 (6) 1,3,5,7-tetraza-1,3,5,7-tetranitrocyclooctane
 (7) 2,4,6-tris(propyl)-s-triazine
 (8) 2,4,6-tris(methyl)-s-triazine
 (9) 2',5'-dimethyl-1,2,4,5-benzobisthiazole
 (10) benzimidazole
 (11) 2,1,3-benzothiadiazole
 (12) polybenzothiazole 4. The method of claim 3 wherein the polyalkadiene binder is a carboxyl terminated polybutadiene and the propellant adjuvant is aluminum.

5. The method of claim 4 wherein the stabilizer is 2,4-diamino-6-phenyl-s-triazine.

6. The method of claim 4 wherein the stabilizer is 2,4,6-tris-(heptafluoropropyl)-s-triazine.

7. The method of claim 4 wherein the stabilizer is 2,4,6-tris-(pentadecafluoroheptyl)-s-triazine.

8. The method of claim 4 wherein the stabilizer is pentadecafluorooctylamidine.

9. The method of claim 4 wherein the stabilizer is 1,3,5-triaza-1,3,5-trinitrocyclohexane.

10. The method of improving the curability of propellant compositions containing from about 40 to 85 parts by weight of hydrazinium diperchlorate oxidizer, from about 10 to 40 parts by weight of a polyalkene binder, and from about 0 to 25 parts by weight of optional propellant adjuvant components, comprising admixing with said propellant compositions prior to curing from about 0.1 to 6.0 parts by weight of a stabilizer selected from the group consisting of:

2,4-diamino-6-phenyl-s-triazine,
2,4,6-tris(heptafluoropropyl)-s-triazine,
2,4,6-tris(pentadecafluoroheptyl)-s-triazine,
pentadecafluorooctylamidine,
1,3,5-triaza-1,3,5-trinitrocyclohexane,
1,3,5,7-tetraza-1,3,5,7-tetranitrocyclooctane,
2,4,6-tris(propyl)-s-triazine,
2,4,6-tris(methyl)-s-triazine,
2',5'-dimethyl-1,2,4,5-benzobisthiazole,
benzimidazole,
2,1,3-benzothiadiazole, and
polybenzothiazole.

11. A stabilized homogenous propellant composition comprising an admixture of the following components in the indicated proportions:
 (a) from about 45 to 85 parts by weight of oxidizer including hydrazinium diperchlorate oxidizer,
 (b) from about 10 to 30 parts by weight of hydrocarbon polymer fuel binder,
 (c) 0 to 20 parts by weight optional propellant adjuvant, and
 (d) from about 0.1 to 6.0 parts by weight of a stabilizer selected from the group consisting of:
  (1) 2,4-diamino-6-phenyl-s-triazine (2) 2,4,6-tris(heptafluoropropyl)-s-triazine
(3) 2,4,6-tris(pentadecafluoroheptyl)-s-triazine
(4) pentadecafluorooctylamidine
(5) 1,3,5-triaza-1,3,5-trinitrocyclohexane
(6) 1,3,5,7-tetraza-1,3,5,7-tetranitrocyclooctane
(7) 2,4,6-tris(propyl-s-triazine
(8) 2,4,6-tris(methyl)-s-triazine
(9) 2',5'-dimethyl-1,2,4,5-benzobisthiazole
(10) benzimidazole
(11) 2,1,3-benzothiadiazole
(12) polybenzothiazole
(13)

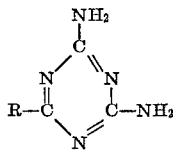

wherein R is selected from the group consisting of hydrogen, phenyl, halogenated phenyl, and $CX_3(CH_2)_n$—, X being a halogen atom, and $n$ is an integer ranging between 0 and 8.
(14)

(14)

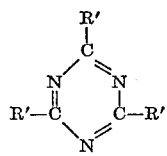

wherein R' is selected from the group consisting of hydrogen and alkyl radicals having from 1 to 8 carbon atoms.
(15)

(15)

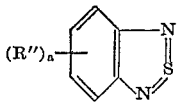

wherein R" is selected from the group consisting of hydrogen, alkyl and $CX_3(CX_2)_n$— wherein the alkyl groups have from 1 to 8 carbon atoms, and varies between 0 and 3, and $n$ varies between 0 and 8.
(16)

(16)

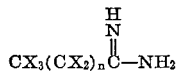

wherein X is halogen, and $n$ varies between 0 and 8.

12. A stabilized homogenous propellant composition comprising an admixture of the following components in the indicated proportions:
(a) from about 45 to 85 parts by weight of hydrazinium diperchlorate,
(b) from about 10 to 30 parts by weight of polyalkane binder,
(c) from about 0 to 20 parts by weight of propellant adjuvants, and
(d) from about 0.1 to 6.0 parts by weight of a stabilizer selected from the group consisting of:
(1) 2,4-diamino-6-phenyl-s-triazine
(2) 2,4,6-tris(heptafluoropropyl)-s-triazine
(3) 2,4,6-tris(pentadecafluoroheptyl)-s-triazine
(4) pentadecafluorooctylamidine
(5) 1,3,5-triaza-1,3,5-trinitrocyclohexane
(6) 1,3,5,7-tetraza-1,3,5,7-tetranitrocyclooctane
(7) 2,4,6-tris(propyl)-s-triazine
(8) 2,4,6-tris(methyl)-s-triazine
(9) 2',5'-dimethyl-1,2,4,5-benzobisthiazole
(10) benzimidazole
(11) 2,1,3-benzothiadiazole
(12) polybenzothiazole 13. A homogeneous propellant composition comprising an admixture of the following components in the indicated proportions:
(a) from about 45 to 85 parts by weight of hydrazinium diperchlorate,
(b) from about 10 to 30 parts by weight of a polyalkadiene binder,
(c) from about 0 to 20 parts by weight of propellant adjuvants, and
(d) from about 0.1 to 6.0 parts by weight of a stabilizer selected from the group consisting of:
(1) 2,4-diamino-6-phenyl-s-triazine
(2) 2,4,6-tris(heptafluoropropyl)-s-triazine
(3) 2,4,6-tris(pentadecafluoroheptyl)-s-triazine
(4) pentadecafluorooctylamidine
(5) 1,3,5-triaza-1,3,5-trinitrocyclohexane
(6) 1,3,5,7-tetraza-1,3,5,7-tetranitrocyclooctane
(7) 2,4,6-tris(propyl)-s-triazine
(8) 2,4,6-tris(methyl)-s-triazine
(9) 2',5'-dimethyl-1,2,4,5-benzobisthiazole
(10) benzimidazole
(11) 2,1,3-benzothiadiazole
(12) polybenzothiazole 14. The homogeneous propellant composition of claim 13 wherein the polyalkadiene is polybutadiene.

15. The homogenous propellant composition of claim 14 carboxyl terminated polybutadiene having a molecular weight range of about 500 to 5000.

16. The composition of claim 15 wherein the stabilizer is 2,4-diamino-6-phenyl-s-triazine.

17. The composition of claim 15 wherein the stabilizer is 2,4,6-tris(heptafluoropropyl)-s-triazine.

18. The composition of claim 15 wherein the stabilizer is pentadecafluoroamidine.

19. The composition of claim 15 wherein the stabilizer is 1,3,5-triaza-1,3,5-trinitrocyclohexane.

20. The composition of claim 15 wherein the stabilizer is 1,3,5,7-tetraza-1,3,5,7-tetranitrocyclooctane.

21. The composition of claim 15 wherein the stabilizer is 2,4,6-tris(propyl)-s-triazine.

22. The composition of claim 15 wherein the stabilizer is 2,4,6-tris(methyl)-s-triazine.

23. The composition of claim 15 wherein the stabilizer is benzothiazole.

24. The composition of claim 15 wherein the stabilizer is 2',5'-dimethyl-1,2,4,5-benzobisthiazole.

25. The composition of claim 15 wherein the stabilizer is 2,1,3-benzothiadiazole.

26. The composition of claim 15 wherein the stabilizer is polybenzothiazole.

27. The composition of claim 15 wherein the stabilizer is benzimidazole.

28. The composition of claim 15 wherein the stabilizer is p-phenylmethionylamine.

29. A homogenous propellant composition comprising an admixture of the following components in the indicated proportions:
(a) from about 45 to 85 parts by weight of hydrazinium diperchlorate,
(b) from about 10 to 30 parts by weight of a fluorinated polyalkane binder,
(c) from about 0 to 20 parts by weight of a propellant adjuvant selected from the group consisting of beryllium and aluminum, and
(d) from about 0.1 to 6.0 parts by weight of a stabilizer selected from the group consisting of:
(1) 2,4-diamino-6-phenyl-s-triazine
(2) 2,4,6-tris(heptafluoropropyl)-s-triazine
(3) 2,4,6-tris(pentadecafluoroheptyl)-s-triazine
(4) pentadecafluorooctylamidine
(5) 1,3,5-triaza-1,3,5-trinitrocyclohexane (6) 1,3,5,7-tetraza-1,3,5,7-tetranitrocyclooctane
(7) 2,4,6-tris(propyl)-s-triazine
(8) 2,4,6-tris(methyl)-s-triazine
(9) 2',5'-dimethyl-1,2,4,5-benzobisthiazole
(10) benzimidazole
(11) 2,1,3-benzothiadiazole
(12) polybenzothiazole 30. A method of improving the curability of propellant compositions containing hydrazinium diperchlorate oxidizer, hydrocarbon polymer fuel binder and optional propellant adjuvant components, comprising the step of admixing with said components a stabilizing amount of a stabilizer per hundred parts by weight of propellant selected from the group consisting of:

(I) 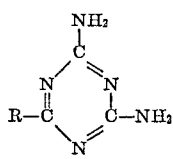

wherein R is selected from the group consisting of hydrogen, phenyl, halogenated phenyl, and $CX_3(CH_2)_n-$, X being a halogen atom, preferably chlorine, and $n$ is an integer ranging between 0 and 8.

(II) 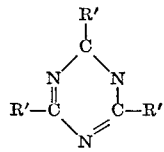

wherein R' is selected from the group consisting of hydrogen and alkyl radicals having from 1 to 8 carbon atoms.

(III) 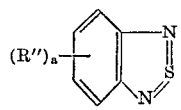

wherein R'' is selected from the group consisting of hydrogen, alkyl and $CX_3(CX_2)_n-$ wherein the alkyl groups have from 1 to 8 carbon atoms, and varies between 0 and 3, and $n$ varies between 0 and 8.

(IV) 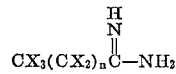

wherein X is halogen, and $n$ varies between 0 and 8.

31. The method of claim 30 wherein the hydrocarbon binder is a carboxyl terminated polybutadiene having a molecular weight range of about 500 to 5000.

References Cited

UNITED STATES PATENTS

| | | | |
|---|---|---|---|
| 3,006,743 | 10/1961 | Fox et al. | 149—36 X |
| 3,087,844 | 4/1963 | Hudson et al. | 149—19 |
| 3,137,599 | 6/1964 | Alsgaard | 149—36 X |
| 3,147,161 | 9/1964 | Abere et al. | 149—19 |
| 3,177,190 | 4/1965 | Hsieh | 149—19 UX |
| 3,257,248 | 6/1966 | Short et al. | 149—19 |

BENJAMIN R. PADGETT, Primary Examiner

U.S. Cl. X.R.

149—36